Dec. 16, 1958   W. B. RASMUSSEN   2,864,538
METERING LIQUID DISPENSER
Filed Sept. 20, 1955   4 Sheets-Sheet 1
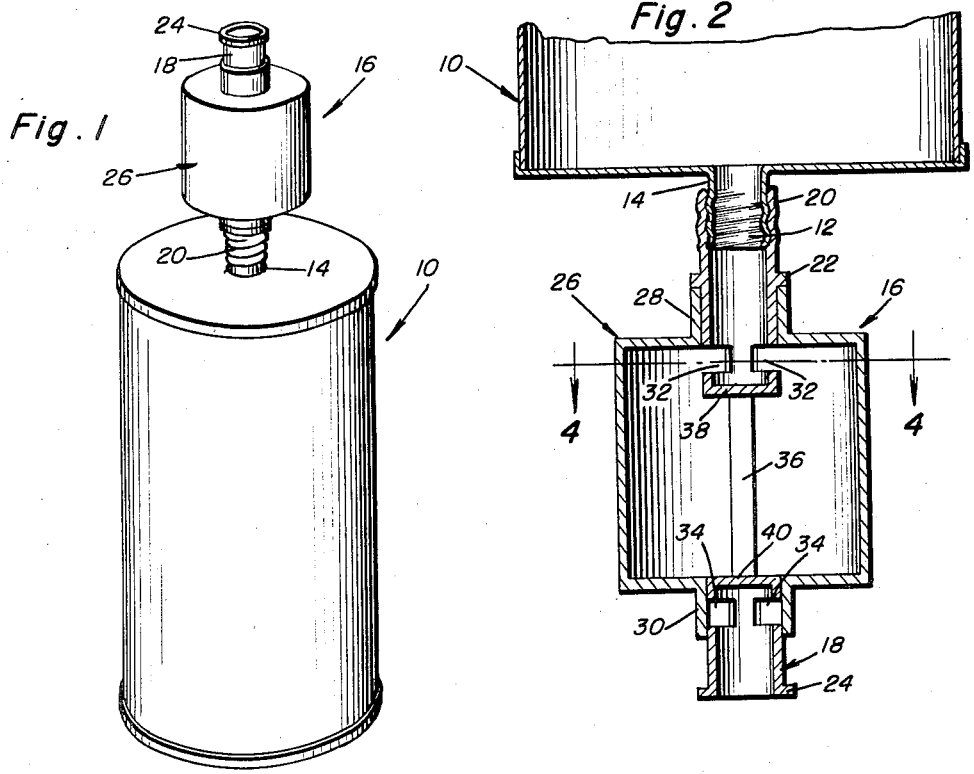
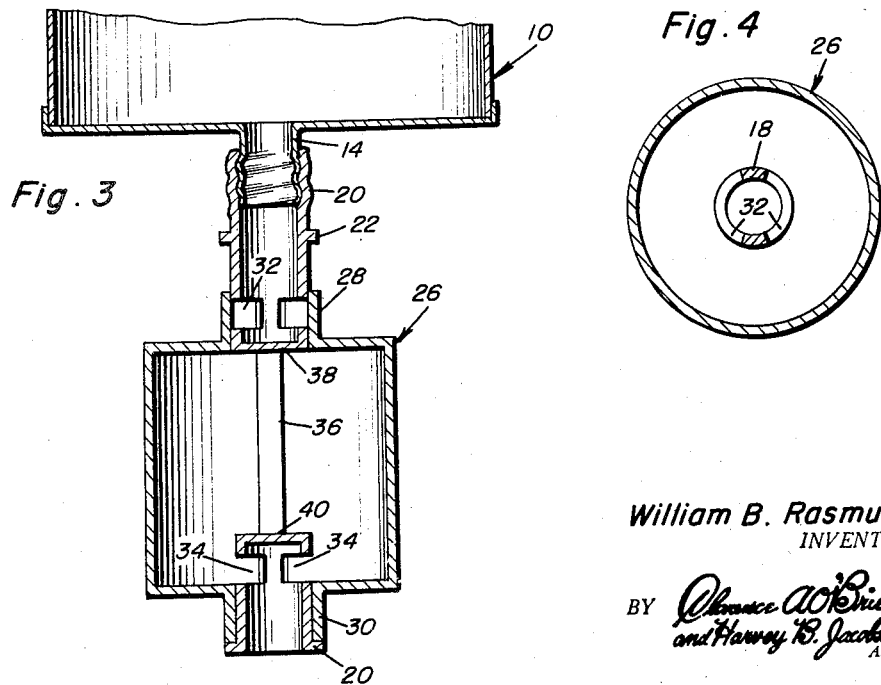
William B. Rasmussen
INVENTOR.

Dec. 16, 1958 W. B. RASMUSSEN 2,864,538
METERING LIQUID DISPENSER
Filed Sept. 20, 1955 4 Sheets-Sheet 2

William B. Rasmussen
INVENTOR.

BY Clarence A. O'Brien
and Harvey B. Jackson
Attorneys

Dec. 16, 1958    W. B. RASMUSSEN    2,864,538
METERING LIQUID DISPENSER
Filed Sept. 20, 1955    4 Sheets-Sheet 3

William B. Rasmussen
INVENTOR.

BY

Dec. 16, 1958 W. B. RASMUSSEN 2,864,538
METERING LIQUID DISPENSER
Filed Sept. 20, 1955 4 Sheets-Sheet 4
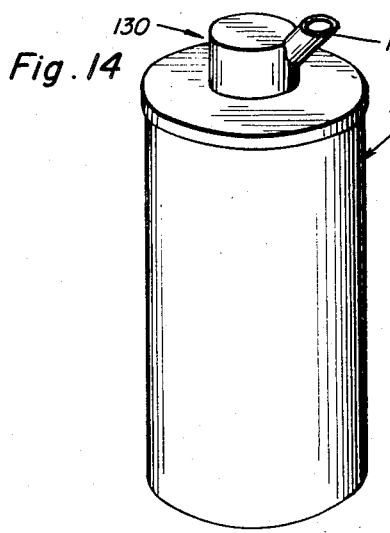
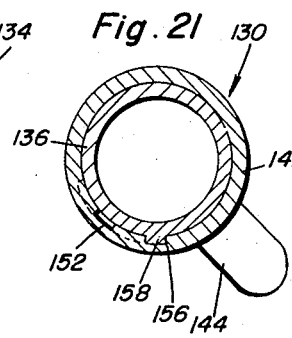
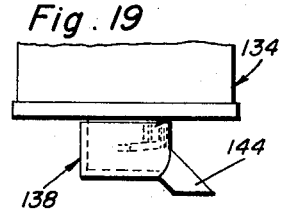
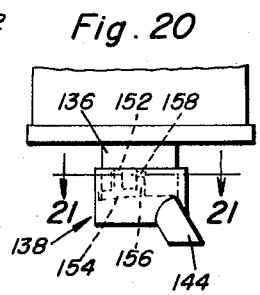
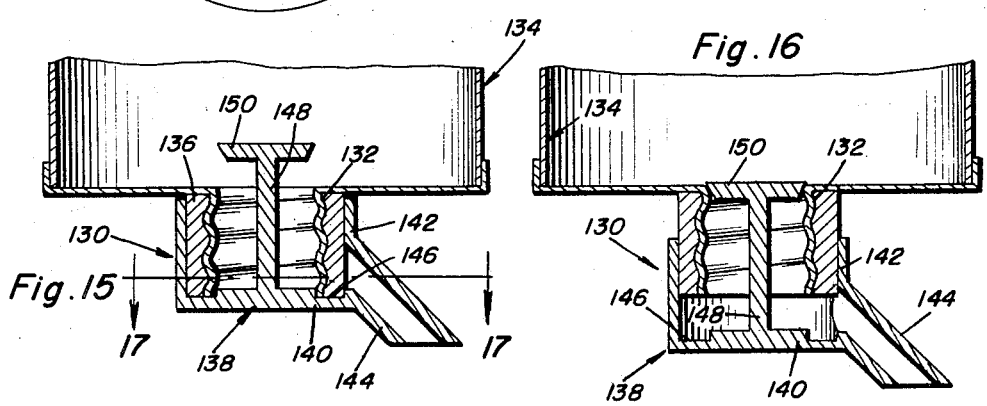
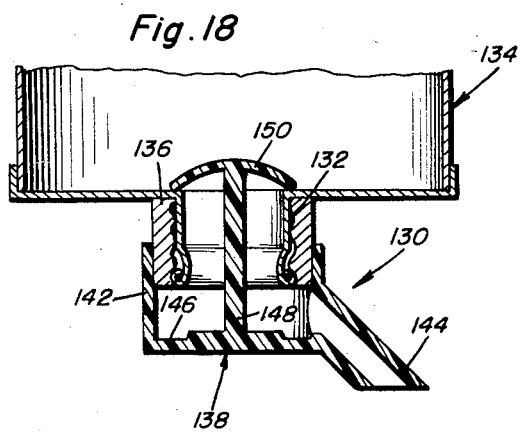
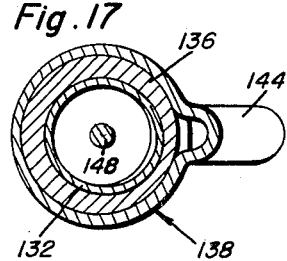
William B. Rasmussen
INVENTOR.

United States Patent Office 2,864,538
Patented Dec. 16, 1958

2,864,538
METERING LIQUID DISPENSER

William B. Rasmussen, Prosser, Wash., assignor of fifty percent to Alvin G. Ash, Tacoma, Wash.

Application September 20, 1955, Serial No. 535,412

3 Claims. (Cl. 222—453)

The present invention relates to the dispensing of materials from containers and more particularly relates to a novel dispenser cap for containers which will simply and effectively dispense metered quantities of material from the container.

The problem of providing a device for attachment to a container whereby just so much material can be poured from the container for each operation is an old one for which many solutions have been offered. Particularly in the dispensing of hard liquors and the like many solutions for the problems have been proposed from relatively simple ball valve operated caps to elaborate weighted chambers movable into opened and closed positions in response to the tilting motion or tilted position of the container to which the cap is attached. Many of these devices, although rather expensive, have been successfully and continue to be successfully used as caps for bottles and the like wherein initial expense is not a great problem and the caps utilized may be transferred from bottle to bottle as the bottles are emptied.

The primary object of the present invention is in the provision of a novel dispenser cap for containers which is exceedingly inexpensive, which can be utilized with throw away containers, which will have little if any bearing on the cost of the container with which it is to be utilized, which adapts itself readily to the pouring of both liquid and solid materials, which can be readily shaped and applied to almost any type container to fit the pouring orifice of the container and which will above all perform, readily, effectively and often.

A further object of the invention, ancillary to the primary object, is the provision of a dispenser cap for containers which will dispense only a predetermined discrete quantity of material from the container upon each tilting movement of the container, which cap will readily absorb punishment without damage to the operation thereof and the structure of which cap is exceedingly simple from the standpoint of manufacture and use.

A further object of the invention is in the provision of novel metering dispenser constructions for containers which may be inexpensively mass produced to serve as dispensing caps for liquid detergent containers and the like for dispensing measured quantities of detergents from such containers in accordance with instructions for the use of such detergents, or soaps, and as well as other materials, in dishwashers, washers, etc. Also, the caps may be utilized in containers for dispensing of almost any material which it is desirable to dispense in measured quantities.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of the container having attached thereto a slidable dispensing cap of the single level filling type;

Figure 2 is a side elevational view of the cap of Figure 1 in inverted position and longitudinal section with the cap disposed in filling position;

Figure 3 is a sectional view through the cap with the cap being shown in dispensing position;

Figure 4 is a cross-sectional view through the cap taken substantially along the plane of section line 4—4 of Figure 2;

Figure 14 is a side elevational view of the container with yet another form of dispensing cap constructed in accordance with the principles of the present invention;

Figure 15 is a cross sectional view of one form of the dispenser cap of Figure 14 with the cap disposed in filling position;

Figure 16 is a cross-sectional view of the cap of Figures 15 with the cap being shown in dispensing position;

Figure 17 is a cross-sectional view through the cap taken substantially along the plane of section line 17—17 of Figure 15;

Figure 18 is a cross-sectional view of another form of the cap of Figure 14;

Figure 19 is a side elevational view of one manner for attaching the cap of Figures 15 or 18;

Figure 20 is a view similar to Figure 19 disclosing the cap in dispensing position; and Figure 21 is a cross-sectional view taken substantially along the plane of section line 21—21 of Figure 20.

Figure 5:
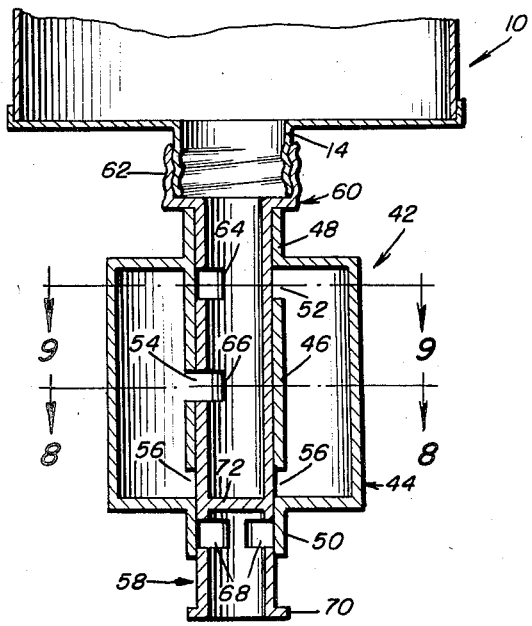
Figure 5 is a cross-sectional view through a slidable and rotatable multiple level dispensing cap in filling position for the lower level thereof.
Figure 9:
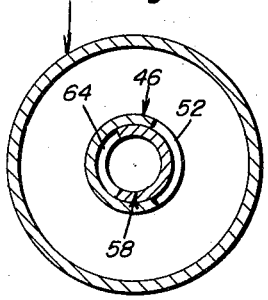
Figure 9 is a cross-sectional view through the upper filling level of the cap taken substantially along the plane of section line 9—9 of Figure 5.
Figure 8:
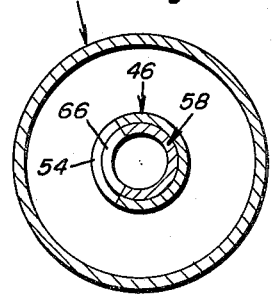
Figure 8 is a cross-sectional view through the cap taken substantially along the plane of section line 8—8 of Figure 5.
Figure 6:
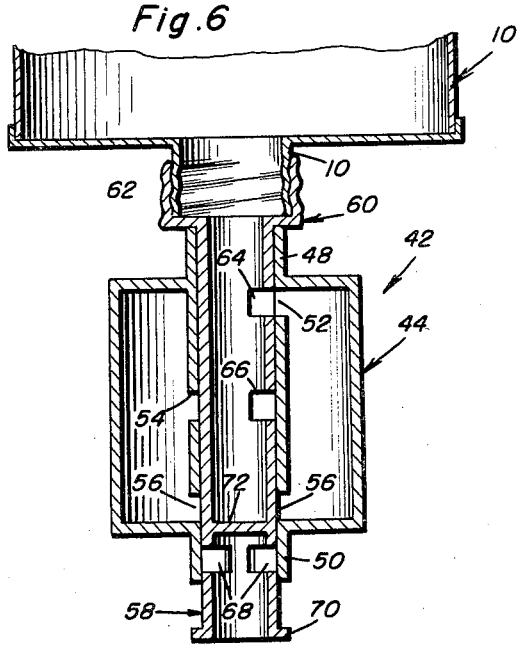
Figure 6 is a cross-sectional view similar to Figure 5 disclosing the dispensing cap in filling position for the upper level thereof.
Figure 7:
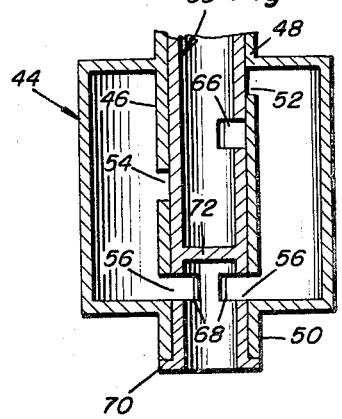
Figure 7 is a view similar to Figures 5 and 6 with the cap being disposed in dispensing position for releasing the contents thereof.

Referring now to the accompanying drawings in detail attention is first directed to the form of the invention disclosed in Figures 1 through 4. In these figures there is disclosed a container 10 of a conventional nature having a mouth or dispensing orifice 12 communicating with the interior of the container through the medium of an elongated neck 14. It is to the neck 14 to which the dispensing cap or device which constitutes the present invention is attached, the form of cap disclosed in Figures 1 through 4 being designated by the numeral 16.

The cap 16 comprises an elongated tube 18 having means 20 at one end thereof for attaching the same to the neck 14 of the container 10, the means 20 disclosed in Figures 1 through 4 taking the form of internal threads by which the tube 18 screws onto the neck of the container so that the tube is in register with the mouth 12 thereof.

Adjacent the threads 20, tube 18 is provided with an annular flange 22 which serves as a stop flange in a manner that will become immediately apparent. At the opposite end, tube 18 is provided with another annular flange 24 which serves as another stop flange.

Slidably carried on the tube is the dispensing cap proper 26 which consists essentially of a housing having a hollow chamber therein of predetermined capacity whereby the housing will hold a measured amount of material.

The opposite ends of the housing are provided with tubular sleeves 28 and 30 respectively by which the housing 26 is slidably and sealingly received on the tube 18 for sliding movement between the filling stop 22 and the dispensing stop 24 on the tube.

The upper end portion of the tube 18 is provided with a pair of diametrically opposite inlet ports 32 and on the lower end portion thereof with a pair of outlet ports 34, also diametrically spaced. The intermediate portion of the tube 18 which is at all times disposed within the housing 26 may take the form simply of longitudinal connecting strips 36 with partition walls 38 and 40 respectively dividing the upper and lower end portions of the tube 18 from the central portion thereof, the central portion being represented by the connecting strips 36.

The spacing of the inlet ports 32 from the outlet ports 34 is such that when one set of ports is within the housing 26 the other set of ports is disposed in closed sealing relation with the end collars or sleeves 28 and 30 of the housing surrounding the tube 18.

Thus, in Figure 2 when the housing is moved upwardly to abut the inlet stop flange 22 on the tube 18, the inlet ports 32 open into the interior of the housing 26 whereby material from the container 10 will flow into the housing but will be prevented from flowing out of the housing by blocking the passage into the outlet ports 34 by means of the partition wall 40 in the tube and by virtue of the sealing relation of the collar 30 to the outlet ports 34 within which collar the outlet ports are received. In this position, the housing 26 will fill and when filled no more material will enter from the container.

Then, upon sliding the housing downwardly on the tube 18 to abutment with the dispensing stop 24, the outlet ports 34 are in communication with the interior of the housing 26 whereas the inlet ports 32 are sealed from the housing by virtue of their sealing engagement within the collar 28 of the housing. Consequently no further material will flow into the housing 26 and that material which is already in the housing 26 will flow from the housing. Of course, in addition to the sealing relation of the collar 28 with the ports 32, the partition wall 38 serves to prevent straight through passage of material from the container 10 into the housing 26.

The shape of the housing 26 is immaterial; however, in the embodiment shown, both the housing 26 and the tube 18 are shown as being circular in cross-section. Either or both of these members could be varied at will since in this modification of the invention there is no necessity for turning movement of either with respect to the other.

In Figures 5 through 9 there is shown a multiple level dispensing cap designated in its entirety by the numeral 42. The cap consists of a hollow housing 44 having an axial sleeve 46 therethrough, the ends of which tube projects beyond each end of the housing 44 to form upper and lower collars 48 and 50 respectively. The sleeve 46 is provided with an upper level filling opening 52 opening within the housing 44 adjacent the upper sleeve 48 and an intermediate level filling opening or port 54 opening into the housing 44 intermediate the upper and lower ends thereof and a discharge or dispensing port or opening 56 opening into the housing 44 adjacent the lower end of the collar 50.

An elongated filling and dispensing tube 58 slidably sealingly mounts the housing 44 thereon through the medium of the housing sleeve 46.

The upper end of the dispensing tube 58 is provided with the annular flange 60 with an upstanding boss 62 interiorly threaded onto the neck 14 of the container 10 so that the discharge tube 58 is in communication with the interior of the container. The dispensing tube 58 is provided with an upper level filling port 64 and an intermediate level filling port 66 and discharge port 68.

At the lower end thereof, the discharge tube 58 is provided with an annular stop flange 70. To close off through passage through the dispensing tube 58, the same is provided with a transverse partition 72 immediately above the discharge port 68 thereof.

To fill the metering dispensing cap 42 to the intermediate level, the housing is pushed upwardly as shown in Figure 5 until the upper sleeve 48 abuts the flange 60 of the dispensing tube 58. In this position, intermediate filling level port 54 is in registry with the intermediate filling port 66 of the dispensing tube 58 whereby material passing down through the tube 58 passes into the housing 56 up to the level of the intermediate filling opening 54.

To fill the housing 44 to its full capacity, the housing is rotated 180° with the upper sleeve 48 still being retained in abutment with the flange 60 until the upper level filling port 64 of the tube 58 is in registry with the upper level filling port 52 of the housing 44. This position is clearly shown in Figure 6.

To dispense material from the housing regardless of whether the housing has been filled to its full capacity or to its intermediate level, the housing is simply slid downwardly along the dispensing tube 58 until the lower sleeve 50 engages the stop flange 70. In this position, the dispensing ports 68 of the dispensing tube 58 register with the dispensing openings 56 of the housing 44 so that the contents flow therefrom.

In Figures 10 through 13 there is disclosed another form of the invention wherein the housing is provided on a dispensing tube for rotatable movement only with respect thereto and no longitudinal movement.

Figure 10:
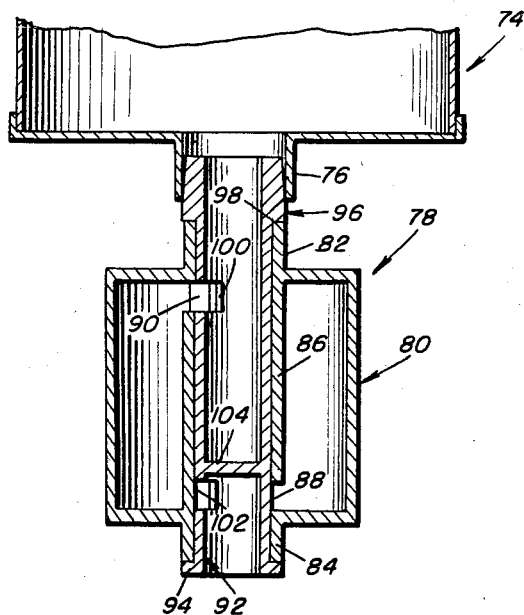
Figure 10 is a longitudinal cross-sectional view of a rotatable single level dispensing cap in filling position for the upper level thereof.

In Figure 10, there is shown a one level filling arrangement wherein the container 74 has a neck 76. The dispensing cap is designated in its entirety by the numeral 78 and comprises the housing 80 having top and bottom axially aligned tubulars 82 and 84 respectively which bosses form a portion of or are in alignment with a tubular sleeve portion 86 extending through the housing 80. The sleeve portion 86 adjacent the lower end of the housing has a discharge orifice or port 88 therethrough and adjacent the upper end of the housing in diametrically opposite relation to the discharge port 88 has a filling or inlet port 90.

The housing 80 is rotatably and non-slidably journaled on a dispensing tube 92 which is provided at the lower end thereof with an annular stop flange 94 engaging the lower end of the lower boss 84 of the housing. The upper end of the dispensing tube 92 is provided with an enlarged slightly conically tapered portion 96 which is joined to the main body of the tube by means of an annular shoulder 98 which forms a stop for the upper flange 82 of the housing 80. Additionally, the enlarged upper end portion 96 of the dispensing tube 92 forms a stopper for insertion into the neck 76 of the container 74 to sealingly mount the tube therein in communication with the interior of the container. Obviously, this fastening means may be substituted for the threaded fasteners in the embodiment of the invention previously described and it is to be understood that they may be substituted for one another.

The dispensing tube 92 is provided at longitudinally spaced points therealong with a filling port 100 and dispensing ports 102 respectively. A partition wall 104 closes communication between the two ports with one another along the tube 92. As will be noted from an examination of Figure 10, the filling port 100 and the discharge port 102 of the dispensing tube 92 are in longitudinal alignment with one another whereas the filling opening 90 and the dispensing opening 88 of the housing 80 are offset 180° from one another. The degree of offset is not critcial as will be readily observed since the only necessity for the offset is so that while the filling opening 90 is in registry with the filling port 100 of the tube 94 the dispensing port 102 of the tube 92 is out of registry with the dispensing opening 88 of the housing whereby the housing will be filled in this position. Upon proper rotation of the housing relative to the dispensing tube 92 so that the filling opening 90 is out of registry with the filling port 100 and the dispensing port 88 is in registry with the dispensing port 102 the contents of the housing 80 are discharged through the tube 92 to dispense a measured quantity of material.

Figure 12:
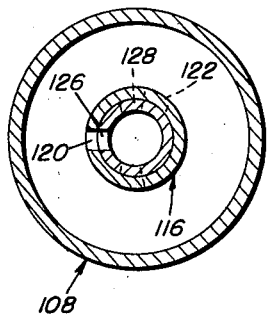
Figure 12 is a cross-sectional view taken substantially along the plane of section line 12—12 of Figure 11.
Figure 11:
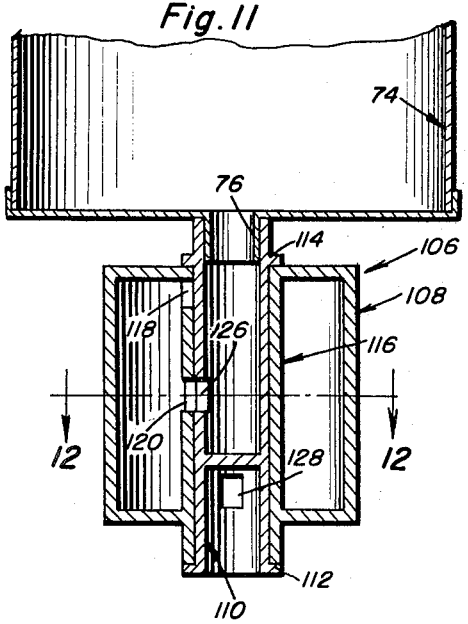
Figure 11 is a view similar to Figure 10 disclosing a multiple level cap in filling position for the lower level thereof.
Figure 13:
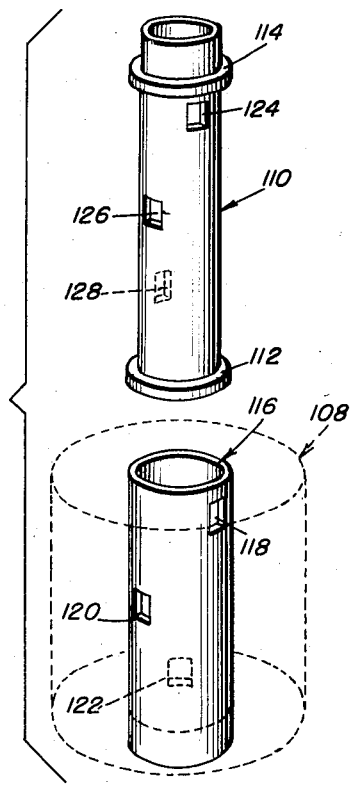
Figure 13 is an exploded perspective view of the parts of the cap disposing the disposition of the inlet and dispensing ports of both the dispensing tube and the dispensing housing relative to one another with the bulk of the housing being shown in phantom outlines for clarity in detail.

In Figures 11 through 13 an arrangement similar to Figure 10 is shown disclosing a multiple level arrangement as set forth in the previous embodiments. In this multiple arrangement, the dispensing cap is designated in its entirety by the numeral 106 and comprises a housing 108 and a dispensing tube 110.

The dispensing tube 110 has an annular stop flange 112 at the lower end thereof and an annular stop flange 114 adjacent the upper end thereof. In this embodiment, the upper end portion of the dispensing sleeve 110 telescopes over the neck 76 of the container 74.

The housing 108 is in engagement at both its upper and lower ends at all times with the stop flanges 114 and 112.

Axially therethrough, the housing 108 is provided with an integral sleeve 116 which is perhaps best seen in Figure 13. This sleeve 116 has adjacent the upper end thereof a capacity level filling opening or port 118 and intermediate the ends thereof an intermediate filling level port or opening 120 and adjacent the lower ends thereof a dispensing opening or port 122. Using the intermediate filling opening 120 as a reference, the upper level filling opening 118 is disposed more than 90° around the circumference of the sleeve therefrom. The dispensing opening 122 on the other hand is disposed slightly less than 90° to the opposite side of the opening of the intermediate filling opening 120.

The tube 110 is provided with an upper level filling port 124 and intermediate level filling port 126 and a dispensing port 128 at longitudinally spaced intervals thereof which are adapted to register with the corresponding ports of the integral sleeve 116 of the housing 108.

Observing Figure 12 particularly it will be seen that when the intermediate ports 120 and 126 are in alignment with one another, the discharge ports 128 and 122 are out of alignment with one another and would require counterclockwise movement of the housing 108 with respect to the tube 110 to bring them into alignment with one another for dispensing the contents of the housing. To the same effect, to bring the upper level filling openings 118 and 124 into registry with one another it will be necessary to rotate the housing in a clockwise direction. This modifiiation provides a multi-level dispensing cap which needs no longitudinal sliding movement in its action.

Figures 14 through 21 disclose a particularly effective construction for certain types of containers of the dispensing cap 130 embodying the principles of the present invention. The dispensing cap 130 is shown mounted on the neck 132 of the container 134.

The cap 130 comprises essentially two parts in its construction, one being a sleeve 136 fitting over the neck 132 of the container and the other being the cap proper 138 which is a circular disk 140 and an annular upstanding side wall 142, the free end of which is adapted to abut the container and which side wall fits telescopically over the sleeve 136. A dispensing spout 144 extends outwardly at an angle from the side wall 142 of the cap 138 adjacent the disk 140 thereof. For sealing purposes, the disk 140 has on the inner surface thereof formed a groove 146 within which the lower end of the sleeve 136 seats as seen in Figures 15 through 18.

Extending upwardly from the interior surface of the circular disk 140 as viewed in Figures 15 through 18 is a post or standard 148 having an enlarged head 150 thereon which when the cap is in closed position as shown in Figure 15 is disposed somewhere within the container 134 so that passage through the neck 132 of the container is clear. Thus when the container is tipped to the position shown in Figure 15, material therefrom flows into the neck 132. Then upon moving the cap 138 downwardly on the sleeve 132 so that the spout 144 is free for pouring, member 150 which serves as a valve closes further entrance of material into the neck 132 of the container and permits that material which is lodged within the neck and the cap 138 to flow from spout 144.

The material of the caps of any of the forms of the invention may be plastic as well as any other suitable material, one plastic form of dispensing cap 130 being shown in Figure 18, with a dome-shaped valve element 150.

To attach the cap proper 138 to its associated sleeve 136, the inner surface of the cap sidewall 142 is provided with a first vertical groove 152 opening into the free edge thereof. The sidewall is also provided intermediate its upper and lower ends with an inclined groove 154 intermediate the ends of which groove 152 opens thereinto. Adjacent the high end of inclined groove 154 as shown in Figure 20, the sidewall 142 is provided with a second vertical groove 156. The lower end of the second vertical groove 156 opens into the high end of inclined slot 154 and the upper end of groove 156 terminates short of the free edge of the cap side wall 142 so that a stop shoulder is provided.

Intermediate its ends sleeve 136 is provided with a radially outwardly extending lug 158 which retains cap 138 thereon in both the open and closed positions of the cap.

To mount cap 138, the cap is first telescoped over sleeve 136 by lining up lug 158 and first vertical groove 152. When the lug 158 seats in inclined groove 154, the cap is turned clockwise so that lug 158 is cammed to the closed end of groove 152 thereby seating cap 138 on sleeve 136 with the free end of sleeve 136 sealingly seating in the annular groove 146 of the cap bottom 140.

To expose the dispensing spout 144 for dispensing the cap contents, the cap 138 is turned in a counterclockwise direction and the container inverted causing lug 158 to ride down second vertical groove 156 to the dispensing positions of Figures 16 and 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A dispensing cap for a container that has an outlet neck, said dispensing cap comprising a hollow housing having an end wall, a sleeve secured to said neck, said hollow housing having an open end and slidably disposed on said sleeve, a discharge opening in said housing and arranged to be controlled by said sleeve in response to movement of said housing on said sleeve, a post fixed to the end wall of said hollow housing and disposed in said neck, and a valve element on said post and coacting with the inner end of said neck to form a valve for the contents of the container.

2. The dispensing cap of claim 1 wherein said end wall of said housing has an inwardly opening groove in which the outer extremity of said sleeve is seated when said housing is fully closed on said sleeve.

3. For use on a container that has a neck, a dispensing cap comprising a sleeve that is disposed on said neck, a housing on said sleeve and having a cylindrical bore for free sliding movement of said housing on said sleeve, said housing including an end wall, a post secured to said end wall and extending concentrically through said sleeve, a valve element at the outer extremity of said post and located in said container in order to form a valve for the passageway defined by said neck, said housing having a discharge opening that is controlled by a part of said sleeve when said housing is moved on said sleeve so that said discharge opening permits a portion of the contents of the container to pass therethrough when said valve element is being returned and is returned to the neck closing position.

References Cited in the file of this patent
UNITED STATES PATENTS

| | | |
|---|---|---|
| 1,454,572 | Walters | May 8, 1923 |
| 2,133,679 | Woeltjen | Oct. 18, 1938 |
| 2,248,958 | Christensen et al. | July 15, 1941 |
| 2,532,787 | Romyns | Dec. 5, 1950 |
| 2,603,397 | Olson | July 15, 1952 |
| 2,612,300 | Mathews | Sept. 30, 1952 |